United States Patent

Dornseiffen

[15] 3,665,962

[45] May 30, 1972

[54] ELECTRICALLY ACTUATED VALVE

[72] Inventor: Josephus D. Dornseiffen, Zevenaar, Netherlands

[73] Assignee: Turmac Tobacco Company N.V., Zevenaar, Netherlands

[22] Filed: Feb. 16, 1970

[21] Appl. No.: 12,418

[30] Foreign Application Priority Data

Feb. 20, 1969 Netherlands..........................6902697

[52] U.S. Cl..........................................137/624.13, 251/129
[51] Int. Cl.......................................................F16k 31/08
[58] Field of Search...............251/129, 141, 140; 137/484.2, 137/509, 624.13

[56] References Cited

UNITED STATES PATENTS

| | | | |
|---|---|---|---|
| 1,186,439 | 6/1916 | Rogers | 251/129 X |
| 1,822,668 | 9/1931 | Protzeller | 251/129 |
| 2,750,961 | 6/1956 | Uritis | 251/129 X |
| 3,053,497 | 9/1962 | Fraenkel | 251/129 X |
| 3,167,094 | 1/1965 | Castelijns | 251/129 X |

FOREIGN PATENTS OR APPLICATIONS

| | | | |
|---|---|---|---|
| 1,322,349 | 2/1963 | France | 251/129 |

Primary Examiner—Arnold Rosenthal
Attorney—Kurt Kelman

[57] ABSTRACT

Device, comprising a permanent magnetic circuit, a coil suspended for reciprocatal movement within the air gap of said circuit, an enclosed space in front of said air gap, a supply duct connecting said space with a source of constant air pressure, a delivery duct connecting said space with the open air, a valve arranged for opening to a limited extent, determined by an adjustable stop member and for closing said space from the inside and located at the end of said delivery duct opening into said space, the said coil being fixedly connected to said valve for movement in unison therewith, said device, on connecting the coil with a source of electric current impulses having a rapid succession being adapted to provide air puffs leaving said delivery duct in accordance with said impulses.

2 Claims, 1 Drawing Figure

Patented May 30, 1972 3,665,962
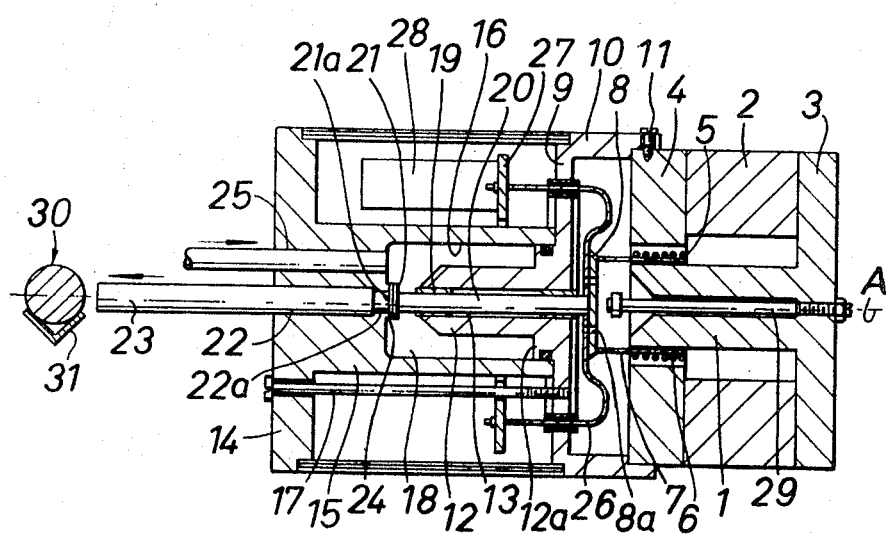
INVENTOR
JOSEPHUS D. DORNSEIFFEN
BY
AGENT

ELECTRICALLY ACTUATED VALVE

The present invention relates to a device, comprising a permanent magnetic circuit, having a coil axially movable in the annular air gap of the pole plate, the ends of said coil being electrically connected with a source of electric current impulses and an enclosed space arranged in the vicinity in front of the pole plate, an overpressure of a gaseous medium prevailing within said space, of which the wall is adapted to be closed from the inside by a valve, the preferably disc-shaped valve-body of which being rigidly connected with the coil-support by means of a valve-rod extending coaxially with the coil-axis through a passage in said wall, the valve-seat being in connection with the atmosphere via a conduct.

Such a device, intended to serve as a control-device for a valve of a pressure-gas or pressure-air container is known, with which is aimed at rapidly opening the valve and relieving the opening-means on maintaining the opening position of the valve. Thereto in the known device as a control means for rapidly opening the valve use is made of an electrical conductor wound on a support in the shape of a coil and arranged in a magnetical field, in order to maintain the self-induction as well as the weight small, whereas for maintaining the valve in its open position use is made of the pressure of the outflowing gas, which pressure e.g. is increased by rendering a special profile to the out-flow aperture. In order to be able to close the valve, the passage of the gas flow having ended, a pressure spring is applied, which presses the valve-body to its closed position.

With a device of the type described in the preamble, the present invention aims at a rapid opening of the valve, at the same time to provide for the rapid closing thereof, due to which it will be possible to convert electrical current impulses, e.g. originating from a pneumatic-electrical or light-electrical or detector, into puffs of short duration of the gaseous medium, which gas-puffs then can advantageously be used for rapidly moving or transferring of light-weight objects, as e.g. portions separated from a continuously made cigarettes' strand.

Thereto, in a device of the above type, according to the invention the opening-movement of the valve-body is adapted to be limited by means of an adjustable stop, one thing and another such, that the coil on being traversed by a current-impulse will exert via said valve-rod a force causing the opening-movement of the valve-body and that after the termination of the current passage in the coil, the valve-body merely under the influence of the overpressure of the gaseous medium within said space will exert a force causing the closing-movement having a direction opposite to the first-mentioned force.

Without more, in the device according to the invention when the current passage in the coil has terminated, and in the open position of the valve, as a consequence of the pressure present within the enclosed space a force will be exerted on the disc-shaped valve-body, which maintains the valve in its open position. By correct adjustment of the stop in the device according to the invention the opening movement of the valve-body is adjusted on a (small) distance such, that the force, due to the pressure prevailing within the enclosed space, exerted on the valve-body will be operating in the closing direction, which force will be larger according as the valve-body is closer adjacent the valve-seat, with which the said force will then operate as a non-linear, strong spring having a very small mass. As a consequence thereof, the repetition-frequency of the valve-movement may reach high values.

Advantageously in a further embodiment of the device according to the invention the mass of the valve-rod, the valve-body and the coil with its attachment to the valve-rod is small with regard to the mass-inertia, e.g. several grams. In this embodiment of the device according to the invention a very high repetition-frequency of the valve-movement is possible without any object, e.g. of 6000 p/min.

The present invention will now be explained with the aid of the accompanying drawing, representing schematically an embodiment thereof.

The device represented in the drawing has been provided with a magnetic circuit consisting of a cylindrical core 1, an annular permanent magnet 2 surrounding this core, a basis plate 3 constituting a unity with the core and an annular pole plate 4. The permanent magnet has been magnetized in such a way that the poles of the free core-end and of the pole plate have opposite polarities.

In the annular air gap 5 between core and pole plate a conductor, wound in the shape of a cylindrical coil 6 on a tubular support 7, is axially movable. Said support 7 has been attached with its outer-end edge against a circular plate 8, which has been provided with a plurality of openings 8a, for the passage of air during movement.

A cylindrical cover having a disc portion 9 and a peripheral edge 10, has been attached to the magnetic circuit by means of several screws 11. The disc portion 9 centrally possesses a hub-portion 12 facing away from the pole plate 4, which portions have been provided with a continuous bore 13 arranged coaxially in line with the coil-axis A. A disc plate 14, having a central hub-portion 15 facing to the pole plate 4, has been provided at the free end of said hub-portion with a wide bore 16, being coaxial in line with the coil axis A. The hollow hub-portion 15 is pressed with its end-edge against the disc portion 9 of the cover by means of several bolts 17 screwed into the cover.

A cylindrical portion 12a on the hub-portion 12, adjacent the disc portion 9, has an outer diameter which is somewhat smaller than the inner diameter of the bore 16. The outer periphery of the cylindrical portion 12a has an annular groove with a sealing ring (not further indicated), for sealing the space 18 within the bore 16 of the hub-portion 12. The cover with its side-edge 10, together with the disc plate 14 and its hub-portion 15, constitute a cap-shaped body arranged before the pole plate 4, extending with the opening over the annular gap 5. Said body together with the disc portion 9 of the cover providing an enclosure for the space 18.

At each end of the bore 13 in the cover has been provided a bearing 19, e.g. of self-lubricating sinter-bronze, for exactly guiding a metal rod 20 in line with the coil-axis A, to the one end of which rod the circular plate 8 has been vertically and perpendicularly attached at its side facing away from the coil 6. To the other end of the rod 20 a small thin metal disc 21 has centrally and perpendicularly been attached, against which metal disc a small thin disc 21a, of similar transverse dimension, made e.g. of rubber, has solidly been vulcanized The small discs 21, 21a constitute the body of a valve, to which will be reverted later. The disc plate 14 and its hub-portion 15 have a centrally arranged bore 22 in line with the coil-axis A, which bore at some distance from the inner surface of the hub-portion 15 merges into a bore 22a, having a smaller diameter. A piece of tubing 23 has been secured in the bore 22. The inner surface of the hub-portion 15, adjacent the bore 22a, extends circumferentially outward as an annular edge 24, to constitute the seat for the body 21, 21a of the above mentioned valve. The bore 13 in the disc portion 9 of the cover is constituting herewith the passage through the wall of the enclosed space 18, which is adapted to be closed from the inside by the valve 21, 21a, which valve has been connected mechanically with the coil 6 via the rod 20, guided in said passage by the bearings 19.

The operation of the device described is as follows.

The space 18 is maintained constantly under pressure of a gaseous medium e.g. air of e.g. 4 atm, via a bore 25 extending through the disc plate 14 and the hub-portion thereof. The ends of the coil 6 are fed via a flexible current conductor 26 with electric control current impulses of e.g. 10 A and period of 600 $\mu$ sec, originating from a suitable source, e.g. a printed circuit 27, having the shape of a disc ring, with associated electronical parts 28, which parts have been connected in circuit according to a known circuit diagram for obtaining short current-impulses, e.g. of the principle as used in electronic photo-flash apparatuses.

The valve 21, 21a, 24 is first in its closed position, due to the overpressure within the space 18. As soon as an electric current impulse flows through the coil 6 being in the permanent magnetic field in the air gap 5, a Lorentz force is exerted on the coil causing the opening-movement of the valve, by which the valve-body is moving away from its seat, which movement is limited by means of an adjustable stop 29, being attached to the magnetic circuit and extending outwardly through a central bore in the core 1 and the basis plate 3, beyond the pole plate 4. A strong puff of air is than carried off via the tube 23 to its mouthpiece. After the current impulse having passed the coil, the Lorentz force is no longer acting on the coil and the valve is closed due to the overpressure of the air in the space 18, as a consequence of a force, causing the closing movement of the valve, said force acting in a direction opposite to said Lorentz force.

In order to have the valve closed with a great velocity, the mass of the coil 6, the support 7 and the circular plate 8 (both e.g. of pertinax), the rod 20 (e.g. of stainless steel) and the valve body 21, 21a (a small disc of aluminum and a small disc of rubber respectively, each having a thickness of 1 mm) is maintained as small as possible e.g. 8 g.

In an embodiment of the device described, in which the section of the valve-body transverse to the coil-axis A (e.g. 11 mm diameter) was considerably larger than that of the bore 22a adjacent the valve-seat (e.g. 6 mm inner diameter) and the section thereof was again larger than that of the end of the rod 20 adjacent the valve-body (e.g. 3 mm diameter), a repetition-frequency of the valve-movement of 6,000 per minute appeared possible without objections.

On adjusting the stop 29 the opening movement may be limited to a suitable distance, in which the force on the valve-body exerted by the air-pressure in the space 18 will be greater in proportion the valve-body is positioned nearer to the valve-seat. Herewith the force exerted on the valve-body under influence of the air-pressure in the space 18 operates as a non-linear spring, due to which jumping back of the moving system and therewith the pneumatic oscillation, is avoided.

The described device may advantageously be applied to separate objects differing to a certain degree from a certain nominal value from a series of moving objects having a small weight.

E.g. in a machine for continuously manufacturing a filter or cigarette strand, coupled with a cutting device and conveyor, by means of which the moving strand is sub-divided into a series of short sections or bars moving on mutual distance. It is namely economically advantageous to be able to separate individually each object in the series differing to a certain degree from the fixed standard, contrary to the known methods, in which e,g, a portion of the series, within which there are differing objects, is separated, or in which objects are separated from the series on account of samples taken at random.

The series of bars 30 formed the moving strand is then guided by means of the schematically represented conveyor 31, e.g. transversely to the coil-axis A of the device according to the invention, at a small distance along the mouthpiece end of the tube 23.

A suitable pickup means arranged behind the strand-machine, before the cutting device, will provide an electric control current signal for each bar-length of the strand passing the pick-up position which bar has the certain degree of difference, e.g. of the average radial dimension, such as can be obtained by means of a "feeler" according to Dutch Pat. application 68 10675.

Said signal may thereupon be fed to the coil 6 of the device according to the present invention via a suitable memory-system, in such a way, that the moment on which a certain control current impulse passes the coil, the bar of which the "feeler" has ascertained a difference indicated by means of said impulse, is just moving past the mouthpiece of the tube 23, so that said bar is thereupon removed from the conveyor 31 by the air puff delivered at that moment.

What is claimed is:
1. A device comprising:
   1. a permanent magnet circuit having an annular pole plate defining an air gap;
   2. a coil axially movable in the air gap of said annular pole plate and electrically connectable to a source of current impulses;
   3. a support for said coil;
   4. a chamber coaxial with said coil and pole plate, said chamber having a wall and lying directly opposite the support for said coil, on the side thereof which faces away from said pole plate;
   5. means for supplying a gaseous medium to said chamber to establish an overpressure therein;
   6. a valve member in said chamber;
   7. an adjustable stop:
   8. a valve having no spring-bias, said valve having a valve-rod rigidly connected to said valve member and to said coil support for closing the wall of said chamber, said valve rod extending coaxially with said coil through a passage in said wall and being returned to its normally closed position by the overpressure in said chamber, said adjustable stop limiting the travel of said valve-rod, and hence the opening of said valve, to a position in which the pressure of the gaseous medium within the chamber exerts a force on the valve in the valve-closing direction; and
   9. a conduit connecting said valve to the atmosphere whereby, when said coil receives a current impulse, said valve is opened and, in the absence of said current impulse, said valve is closed by said overpressure.
2. The device according to claim 1, wherein the combined mass of said valve and coil is relatively small compared to the mass-inertia of the device.

* * * * *